US009747778B2

(12) United States Patent
Mukherji et al.

(10) Patent No.: US 9,747,778 B2
(45) Date of Patent: Aug. 29, 2017

(54) CONTEXT-AWARE COMPLIANCE MONITORING

(71) Applicant: Samsung Electronics, Co., Ltd., Suwon Si, Gyeonggi-Do (KR)

(72) Inventors: Abhishek Mukherji, Milpitas, CA (US); Evan Welbourne, San Francisco, CA (US); Yoshiya Hirase, Santa Clara, CA (US); Emmanuel Munguia Tapia, Newark, CA (US)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

(21) Appl. No.: 14/305,236

(22) Filed: Jun. 16, 2014

(65) Prior Publication Data

US 2015/0170501 A1    Jun. 18, 2015

Related U.S. Application Data

(60) Provisional application No. 61/917,291, filed on Dec. 17, 2013.

(51) Int. Cl.
*G08B 21/24* (2006.01)
*G06Q 50/10* (2012.01)
*G06F 17/30* (2006.01)

(52) U.S. Cl.
CPC .......... *G08B 21/245* (2013.01); *G06Q 50/10* (2013.01); *G06F 17/30507* (2013.01)

(58) Field of Classification Search
CPC ............ G06F 21/554; G06F 17/30507; G06F 17/30699; G06F 17/30705; G06F 17/30734; H04L 63/1416
See application file for complete search history.

(56) References Cited

U.S. PATENT DOCUMENTS

| | | | |
|---|---|---|---|
| 6,522,250 B1* | 2/2003 | Ernst ..................... | G08B 27/00 340/539.1 |
| 8,368,544 B2 | 2/2013 | Wildman et al. | |
| 9,075,668 B1* | 7/2015 | Hushon .................... | G06F 9/54 |
| 2009/0089078 A1* | 4/2009 | Bursey ................. | G06Q 10/101 705/300 |
| 2010/0070981 A1* | 3/2010 | Hadar ..................... | G06F 9/542 719/318 |
| 2012/0004956 A1* | 1/2012 | Huston .............. | G06Q 30/0207 705/14.1 |
| 2012/0179421 A1* | 7/2012 | Dasgupta ........... | G05B 23/0281 702/181 |
| 2012/0224057 A1* | 9/2012 | Gill ......................... | G06F 21/55 348/143 |
| 2013/0325890 A1* | 12/2013 | Vaught .............. | G06F 17/30516 707/759 |

(Continued)

OTHER PUBLICATIONS

The Joint Commission,"Measureing Hand Hygiene Adherence: Overcoming the Challenges", 2009, Oakbrook Terrace, IL.

*Primary Examiner* — Hongmin Fan
(74) *Attorney, Agent, or Firm* — Thomas George; Ruke Wang; Justin Chang

(57) ABSTRACT

In one embodiment, a monitoring method is described. The method includes detecting a set of contextual information by a monitoring device, and retrieving from the monitoring device a particular compliance query that adapts to the detected contextual information from one or more compliance queries.

23 Claims, 13 Drawing Sheets

(56) References Cited

U.S. PATENT DOCUMENTS

| | | | |
|---|---|---|---|
| 2013/0332065 A1* | 12/2013 | Hakim | H04W 64/00 701/411 |
| 2014/0009292 A1* | 1/2014 | Long | H04Q 9/00 340/573.1 |
| 2015/0040064 A1* | 2/2015 | Adi | G06F 3/04847 715/810 |
| 2015/0051918 A1* | 2/2015 | Kehoe | G06F 19/322 705/3 |
| 2015/0312404 A1* | 10/2015 | Abramson | H04W 4/027 455/418 |

* cited by examiner

| (Source-Destination) | Suggested Time Window Size |
|---|---|
| Same Wing (SWG), Same Floor (SF) | 5 minutes |
| Diff. WG (DWG), SF | 10 minutes |
| SWG, Diff Floor (DF) | 10 minutes |
| DWG, DF | 15 minutes |
| ......... | ......... |

FIG. 7A

| (Source-Destination) | Suggested Time Window Size |
|---|---|
| SWG, SF, SW | 10 minutes |
| SWG, SF, BW | 5 minutes |
| DWG, SF, SW | 15 minutes |
| DWG, SF, BW | 10 minutes |
| ......... | ......... |

FIG. 7B

EVENT SEQ(Exit OT, !Disinfect, Enter ICU)
OTWING==ICUWING AND
OTFLOOR==ICUFLOOR
MOVEMENT BW
WITHIN 5 minutes
List 901

EVENT SEQ(Exit OT, !Disinfect, Enter ICU)
OTWING==ICUWING AND
OTFLOOR<>ICUFLOOR
MOVEMENT BW
WITHIN 15 minutes
List 905

EVENT SEQ(Exit OT, !Disinfect, Enter ICU)
OTWING==ICUWING AND
OTFLOOR==ICUFLOOR
MOVEMENT SW
WITHIN 10 minutes
List 902

EVENT SEQ(Exit OT, !Disinfect, Enter ICU)
OTWING==ICUWING AND
OTFLOOR<>ICUFLOOR
MOVEMENT SW
WITHIN 20 minutes
List 906

EVENT SEQ(Exit OT, !Disinfect, Enter ICU)
OTWING<>ICUWING AND
OTFLOOR==ICUFLOOR
MOVEMENT BW
WITHIN 10 minutes
List 903

EVENT SEQ(Exit OT, !Disinfect, Enter ICU)
OTWING<>ICUWING AND
OTFLOOR<>ICUFLOOR
MOVEMENT BW
WITHIN 25 minutes
List 907

EVENT SEQ(Exit OT, !Disinfect, Enter ICU)
OTWING<>ICUWING AND
OTFLOOR==ICUFLOOR
MOVEMENT SW
WITHIN 15 minutes
List 904

EVENT SEQ(Exit OT, !Disinfect, Enter ICU)
OTWING<>ICUWING AND
OTFLOOR<>ICUFLOOR
MOVEMENT SW
WITHIN 30 minutes
List 908

FIG.9

EVENT SEQ(Exit OT, !Disinfect, Enter ICU)
WHERE [ID]
WITHIN 10 minutes
List 1201 Compliance Query Q1

EVENT SEQ(Exit Hazardous Material Disposal,
!(Antibacterial Hand Wipe AND Micro-
encapsulation absorbent AND Handwash),
Enter ICU)
WHERE [ID]
WITHIN 20 minutes
List 1202 Compliance Query Q2

EVENT SEQ(Exit Break Room, !(Antibacterial
Hand Wipe OR Micro-encapsulation absorbent
OR Handwash), Enter Ward)
WHERE [ID]
WITHIN 10 minutes
List 1203 Compliance Query Q3

EVENT SEQ(Exit CA, !Disinfect, Enter SA)
WHERE [ID]
WITHIN 10 minutes
List 1204 Compliance Query Q4

EVENT SEQ(Exit CA, !(L2 OR L3 OR L4 OR L5), Enter
SA)
WHERE [ID]
WITHIN 10 minutes
List 1205 Compliance Query Q5

EVENT SEQ(Exit QT, !Disinfect, Enter ICU)
WHERE [ID] AND PROFILE = "Senior"
WITHIN 10 minutes
List 1206 Compliance Query Q6

EVENT SEQ(Recycle, !(Sharpen, Disinfect, Check), Enter
OT)
WHERE [ID] AND DESIGNATION = "Medical Assistant"
WITHIN 30 minutes
List 1207 Compliance Query Q7

EVENT SEQ(!Disinfect, Enter ICU)
WITHIN 5 minutes
List 1208 Compliance Query Q8

EVENT SEQ(Exit OT, !Disinfect, Enter ICU)
OTWING==ICUWING AND OTFLOOR==ICUFLOOR
WITHIN 5 minutes
List 1209 Compliance Query Q9

EVENT SEQ(Exit OT, !Disinfect, Enter ICU)
OTWING<>ICUWING AND OTFLOOR==ICUFLOOR
WITHIN 10 minutes
List 1210 Compliance Query Q10

EVENT SEQ(Exit OT, !Disinfect, Enter ICU)
OTWING<>ICUWING AND OTFLOOR==ICUFLOOR
PATH=NO_DIRECT_PATH
WITHIN 20 minutes
List 1211 Compliance Query Q11

EVENT SEQ(Exit OT, !Disinfect, Enter ICU)
OTWING==ICUWING AND OTFLOOR==ICUFLOOR
MOVEMENT SW
WITHIN 10 minutes
List 1212 Compliance Query Q12

EVENT SEQ(Exit OT, !Disinfect, Enter ICU)
OTWING<>ICUWING AND OTFLOOR==ICUFLOOR
MOVEMENT SW
WITHIN 15 minutes
List 1213 Compliance Query Q13

FIG.12 ized CEP engine with a non-discriminating compliance violation alerting mechanism is facing ever growing challenges. On one hand, there are increasing privacy concerns that people become more and more reluctant to have compliance activities or violations monitored by and/or reported to a centralized server. On the other hand, people prefer not to have their compliance status publicly displayed. Moreover, there is a trend that more and more industries and businesses are embracing "Bring Your Own Device" (BYOD) initiatives that individuals are allowed to carry their personal devices to work. Therefore, there is a need to provide a context-aware privacy-preserving compliance solution that runs a CEP engine on individual's personal smart devices.

CONTEXT-AWARE COMPLIANCE MONITORING

CROSS-REFERENCE TO RELATED APPLICATION(S)

This application claims the benefit, under 35 U.S.C. §119(e), of U.S. Provisional Patent Application No. 61/917,291 filed Dec. 17, 2013, and the subject matter thereof is incorporated herein by reference thereto.

TECHNICAL FIELD

One or more embodiments relate generally to context-aware compliance monitoring and reporting system and devices.

BACKGROUND

Compliance monitoring has been employed in a wide range of industries or domains, including but not limited to, health care, financial institution, mining, manufacturing, construction and travel, etc. There has been an increasing demand to strengthen compliance monitoring due to heightened governmental regulations and/or health and safety requirements.

Event processing is a method of tracking and analyzing streams of events (things that take place) information, and deriving a conclusion. Various event processing solutions have been adopted to provide effective compliance monitoring.

Complex Event Processing (CEP) is an approach that continuously collects, processes and analyzes real-time data from multiple sources. It focuses on detecting a situation or a pattern, which can be a specific sequence of events, in continuous event streams. CEP provides a measure to identify meaningful events and respond to them as quickly as possible.

A CEP system, in general, evaluates queries over real-time event data, and assists derivation of intelligence to produce result without delay. CEP queries are distinctive from the regular Structured Query Language (SQL) queries. CEP queries process real time streaming data, while SQL queries process static tabular data in traditional database systems. Moreover, CEP queries are long standing queries that are submitted ahead of time, while SQL queries are instantaneous.

CEP applications define how events are processed and analyzed. Correspondingly, CEP technology has been implemented in various industries and services to deploy applications such as, for example, opportunity and risk analysis, behavior monitoring, fraud detection, and business process management. A compliance monitoring system can also take advantage of a CEP system.

Existing CEP-powered compliance monitoring solutions utilize Radio-Frequency Identification (RFID) badges or other types of wearable monitoring devices, which can be read by sensors installed at locations of compliance interest. A centralized CEP engine is also required to track all event data transmitted from every individual RFID badge or wearable monitoring device, to run CEP compliance queries, to send compliance violation alerts to the badges and/or wearable monitoring devices, and to generate report of compliance status. The conventional technologies, thus, require setting up sensor infrastructures at the places where compliance monitoring is performed. However, installation of additional sensing infrastructure with subscription-based monitoring devices may be cost-prohibitive or impossible.

Moreover, a centralized CEP engine with a non-discriminating compliance violation alerting mechanism is facing ever growing challenges. On one hand, there are increasing privacy concerns that people become more and more reluctant to have compliance activities or violations monitored by and/or reported to a centralized server. On the other hand, people prefer not to have their compliance status publicly displayed. Moreover, there is a trend that more and more industries and businesses are embracing "Bring Your Own Device" (BYOD) initiatives that individuals are allowed to carry their personal devices to work. Therefore, there is a need to provide a context-aware privacy-preserving compliance solution that runs a CEP engine on individual's personal smart devices.

SUMMARY

An embodiment of a method for monitoring includes detecting a set of contextual information by a monitoring device, and retrieving a particular compliance query that adapts to the detected contextual information from one or more compliance queries from the monitoring device.

An embodiment of a method for formulating a compliance query includes identifying a compliance event sequence, and formulating a compliance query. The parameters of the compliance query are translated from the compliance event sequence based on ontology.

An embodiment of a device for monitoring, and notification has at least one processor and memory. The device is configured to detect a set of contextual information, to receive another set of contextual information, and to retrieve a compliance query adapting to the detected set of contextual information and the received set of contextual information.

An embodiment of the monitoring device includes an interface. The monitoring device is configured to provide notification information in a mode at the interface when there is a determination of a compliance violation. The mode gradually changes based on actions taken in response to the notification information.

Many other features and embodiments of the present invention will be apparent from the accompanying drawings and from the following detailed description.

BRIEF DESCRIPTION OF THE DRAWINGS

FIGS. 7A and 7B illustrate examples of CEP query time window size adjustment based on contextual information.

FIG. 9 illustrates examples of context-aware compliance query adaptions.

FIG. 12 illustrates examples of compliance CEP queries.

DETAILED DESCRIPTION OF EXAMPLE EMBODIMENTS

Figure 1:
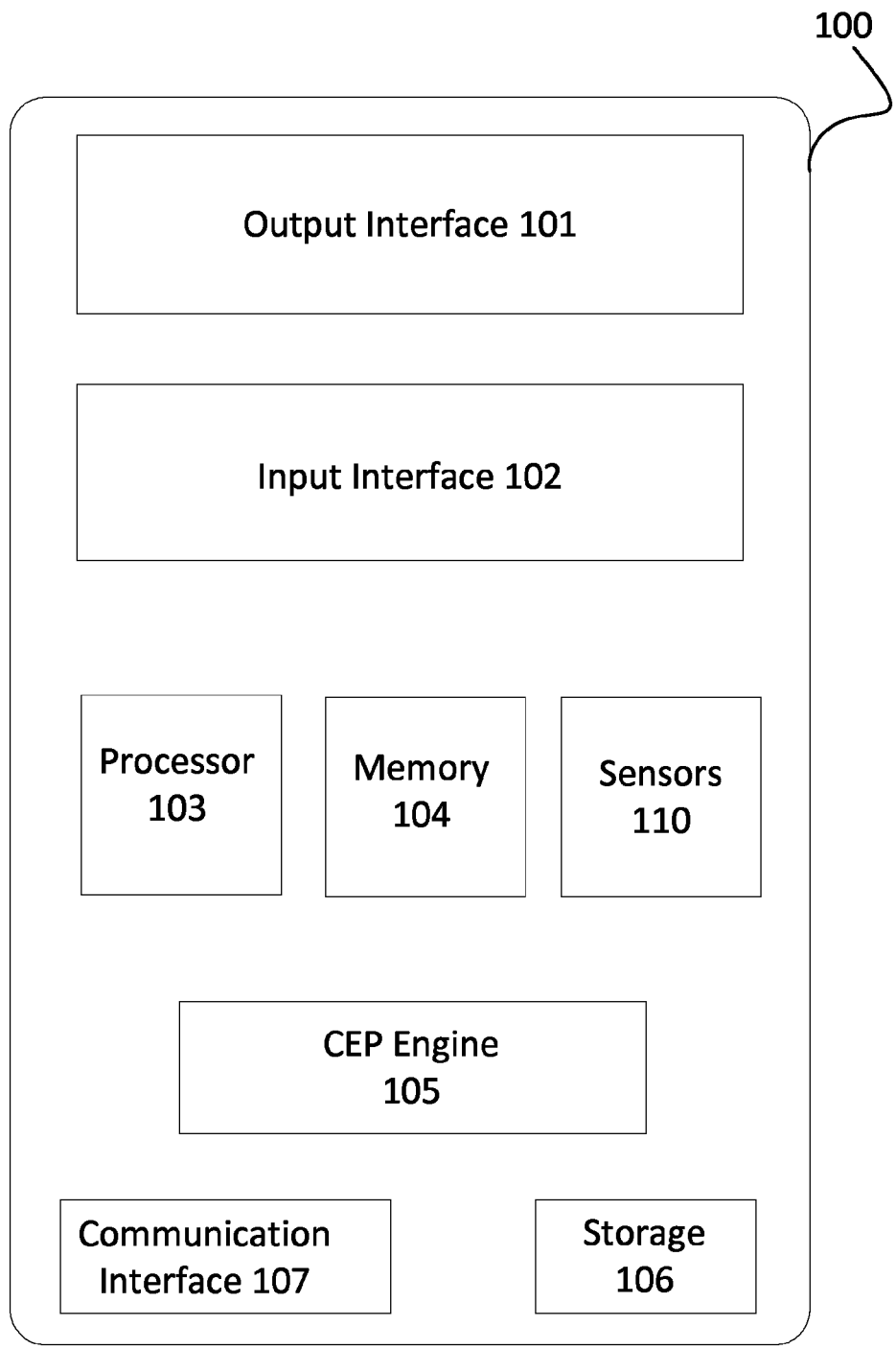
FIG. 1 illustrates an example compliance monitoring device, which runs context-aware CEP queries.

Reference will now be made in detail to some specific embodiments of the present invention. Examples of these specific embodiments are illustrated in the accompanying drawings. While the invention is described in conjunction with such specific embodiments, those skilled in the art will appreciate numerous modifications and variations therefrom. It is intended that the appended claims cover all such alternatives, modifications, variations and equivalents falling within the true spirit and scope of this present invention.

The accompanying drawings are intended to help understanding of the units and interoperations among them. The drawings are not to scale. Emphasis has been placed upon illustrating the principles of various embodiments.

Compliance monitoring is achieved via running compliance CEP queries. Although this disclosure describes and illustrates a compliance monitoring system mostly in the health care industry, a hospital per se, this disclosure contemplates deployment of the compliance monitoring system in any suitable industries, services or domains. One of ordinary skill in the art will appreciate that the technology, devices, methods and processes disclosed are equally applicable to other industries, services or domains.

FIG. 12 illustrates compliance CEP query examples for Hospital A. A compliance CEP query comprises multiple parameters to identify the sequence of events, the time restraint imposed on completion of such a sequence of events, and to whom this compliance query is applied, etc. The parameters can take various formats such as clauses or definitions. In List 1201, the EVENT clause of Compliance Query Q1 defines an event sequence of three events—exiting an Operation Theatre (OT), disinfecting, and entering an Intensive Care Unit (ICU). This event sequence is tracked by the CEP engine to enforce compliance of one specific hygiene regulation that requires the individual monitored complete disinfection within 10 minutes after leaving an OT and before entering an ICU. The last event of the event sequence, "Enter ICU," is deemed as a triggering event. A triggering event causes the CEP engine to process all compliance CEP queries having the same triggering event in order to determine whether a violation has happened. The WHERE clause provides the identity of a health care worker (HCW) of Hospital A to ensure that the CEP engine understands to whom the identified event sequences are applied. The WITHIN clause specifies a time window size of 10 minutes, over which Compliance Query Q1 will be evaluated by the CEP engine. If events "Exit OT," "!Disinfect," and "Enter ICU" have occurred in the sequence as listed in the EVENT clause within 10 minutes, Compliance Query Q1 is deemed satisfied and no compliance violation is detected for this individual HCW.

While List 1201 provides one example of a compliance CEP query using SQL grammar, different query formats or languages may be employed to formulate queries to describe similar event sequences. The clauses and event denotation of Compliance Query Q1 are for illustrative purpose only, and one of ordinary skill in the art will appreciate that a query may include more than one event sequence with more or less events identified in each sequence, and/or include different clauses and parameters.

Conventionally, when a monitored HCW moves around Hospital A, her RFID badge or alternative wearable devices is read by sensors installed at various locations. The sensor readings are abstracted as events and transmitted to a centralized CEP engine to process compliance CEP queries such as Compliance Query Q1 to detect and record hygiene compliance or violations. For example, if the centralized CEP engine hasn't received sensor data from any disinfection facilities, from the time the HCW exits an OT to the time she enters an ICU, the centralized CEP engine determines that the HCW has skipped disinfecting, which constitutes a hygiene violation that can be a serious offense in a hospital. As a result, an alert or warning may be displayed to the HCW's badge or wearable device and reported to a centralized compliance violation log server. If the centralized CEP engine has received sensor data from one of the disinfection facilities, from the time the HCW exits an OT to the time she enters an ICU, with more than 10 minutes lapsed, the centralized CEP engine still determines that the HCW has not disinfected properly that an alert or warning may be displayed to the HCW's badge or wearable device, and reported to a centralized compliance violation log server.

In one particular embodiment, the centralized CEP engine is replaced with on-device CEP engines that each of them resides on a HCW's individual compliance monitoring device. FIG. 1 illustrates an example of a device such as, e.g. a compliance monitoring device (CMD) 100. This disclosure contemplates any suitable number of CUD 100 taking any suitable physical form. As example and not by way of limitation. CUD 100 may be a computing system such as an embedded computing system, a system-on-chip (SOC), a single-board computing system (SBC), a desktop computer, a laptop or notebook computer, an interactive kiosk, a mainframe, a mesh of computing systems, a mobile device, a personal digital assistant (PDA), a server, a tablet, or a combination of two or more of these. Where appropriate, CMD 100 may include one or more CMDs 100; be unitary or distributed; span multiple locations; span multiple machines; span multiple data centers; or reside in a cloud, which may include one or more cloud components in one or more networks. Where appropriate, one or more CMDs 100 may perform without substantial spatial or temporal limitation one or more steps of one or more methods described or illustrated herein. As an example and not by way of limitation, one or more CMDs 100 may perform in real time or in batch mode one or more steps of one or more methods described or illustrated herein. One or more CMDs 100 may perform at different times or at different locations one or more steps of one or more methods described or illustrated herein, where appropriate.

In one embodiment, CMD 100 comprises a processor 103, memory 104, a CEP engine 105 and storage 106. It also includes an output interface 101, an input interface 102 and a communication interface 107, CMD 100 further comprises a set of sensors 110. Although this disclosure describes and illustrates a particular CMD having a particular number of particular units in a particular arrangement, this disclosure contemplates any suitable CMD having any suitable number of any suitable units in any suitable arrangement.

In one embodiment, processor 103 includes hardware for executing instructions, such as those making up a computer program. As an example and not by way of limitation, to execute instructions, processor 103 may retrieve (or fetch)

the instructions from an internal register, an internal cache, memory 104, or storage 106; decode and execute them; and then write one or more results to an internal register, an internal cache, memory 104, or storage 106. In particular embodiments, processor 103 may include one or more internal caches for data, instructions, or addresses. This disclosure contemplates processor 103 including any suitable number of any suitable internal caches, where appropriate. In particular embodiments, processor 103 may include one or more internal registers for data, instructions, or addresses. This disclosure contemplates processor 103 including any suitable number of any suitable internal registers, where appropriate. Where appropriate, processor 103 may include one or more arithmetic logic units (ALUs); be a multi-core processor; or include one or more processors 103.

CEP engine 105 enables on-device CEP. Instead of transmitting event data from multiple devices to a centralized CEP engine to perform CEP, compliance CEP is carried out by CEP engine 105 at CMD 100. In a particular embodiment, functions of CEP engine 105 are provided by processor 103. In another embodiment, CEP engine 105 is a unit separate from processor 103 and is dedicated to conduct compliance CEP only. With CEP performed on CMD 100, it is no longer necessary to include identity of an individual in each CEP query. Therefore, it will be appreciated that the WHERE clause, as illustrated in List 1201, is of no significant importance to properly perform on-device CEP, notwithstanding some compliance query examples in the rest of this disclosure still include such clauses.

According to various embodiments, input interface 102 may be capable of receiving a user input via touch, voice, gesture, motion, or a combination of such, etc. Input interface 102 may receive user input via physical and/or virtual keypad, keyboard, touch sensitive surface, mouse, control bars, handles, balls or wheels, microphone, camera, stylus, and/or other input control means, individually or in combination. Output interface 101 is configured to present data in various formats, including but not limited to, audible sound (e.g., beep, ring, spoken message, etc.), visual indicator (flashing, color variation, illumination variation, text, image, motion variation of content presently displayed, etc.), and/or tactile or haptic notion (e.g., vibrate). Output interface 101 may be further configured to cause a motion (e.g., spin, flip, etc.) of CMD 100. Output interface 101 may present data output via speaker, monitor, LED, printer, scanner, projector, and/or other output display means, individually or in combination. Output interface 101 and input interface 102 can be combined into a single interface, which is configured to both display output and receive user input. Interfaces 101 and 102 include hardware, software, or both. CMD 100 may include one or more of these interfaces, where appropriate. Where appropriate, interfaces 101 and 102 may include one or more device or software drivers enabling processor 103 to drive one or more of these interfaces.

According to various embodiments, communication interface 107 enables communication among CMDs 100, and/or between a CMD 100 and the compliance monitoring system. As an example and not by way of limitation, communication interface 107 may include a network interface controller (NIC) or network adapter for communicating with an Ethernet or other wire-based network or a wireless NIC (WNIC) or wireless adapter for communicating with a wireless network, such as a Wi-Fi network. As an example and not by way of limitation, CMD 100 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. CMD 100 may also include antenna for communicating with a cellular telephone network. CMD 100 may include any suitable communication interface 107 for any of these networks, where appropriate. Communication interface 107 may include one or more communication interfaces 107, where appropriate. Although this disclosure describes and illustrates a particular communication interface, this disclosure contemplates any suitable communication interface.

According to various embodiments, sensors 110 include but not limited to accelerometer, thermometer, compass, acoustic sensor, light sensor, gyroscope, barometer, proximity sensor, Bluetooth, Global Position System (GPS) sensor, Wi-Fi, Wireless, clock, camera, Micro-Electro-Mechanical systems (MEMs) inertial sensor, etc. Data captured by sensors 110 help the determination of contextual information. For example, accelerometer and/or MEMs can help determine or estimate walking speed, step length, and transportation mode. As an example, real-time readings of the clock, accelerometer, Bluetooth and Wi-Fi may be used to identify, the time, location, movement speed, step length estimation, transportation mode detection, and/or movement orientation of CMD 100. Sensor data is processed by CEP engine 105 to assist monitoring of an individual HCW's compliance status. Sensors 110 can be integrated with input interface 102 and output interface 101. Sensors 110 can also be part of communication interface 107.

In particular embodiments, memory 104 includes main memory for storing instructions for processor 103 to execute or data for processor 103 to operate on. As an example and not by way of limitation, instructions from storage 106 or another source is loaded to memory 104. Processor 103 may then execute these instructions. During or after execution of the instructions, processor 103 may write one or more results (which may be intermediate or final results) to memory 104. In particular embodiments, memory 104 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM Memory 104 may include one or more memories 104, where appropriate.

Storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to CMD 100, where appropriate. In particular embodiments, storage 106 is non-volatile, solid-state memory. In particular embodiments, storage 106 includes read-only memory (ROM). Where appropriate, this ROM may be mask-programmed RUM, programmable ROM (PROM), erasable PROM (EPROM), electrically erasable PROM (EEPROM), electrically alterable ROM (EAROM), or flash memory cards (e.g., secure digital (SD) card, miniSD, microSD, SDXC, compact flash card, etc.) or a combination of two or more of these. This disclosure contemplates mass storage 106 taking any suitable physical form. Where appropriate, storage 106 may include one or more storages 106. As an example, sensor data captured by sensors 110 may be stored into storage 106. Storage 106 may be combined with memory 104. Storage 106 may save sensor data and interface data in a machine readable raw format or in a human readable transformed format. Storage 106 may also store detection of compliance violations. Furthermore, storage 106 may store compliance queries, or part of such.

Figure 2:
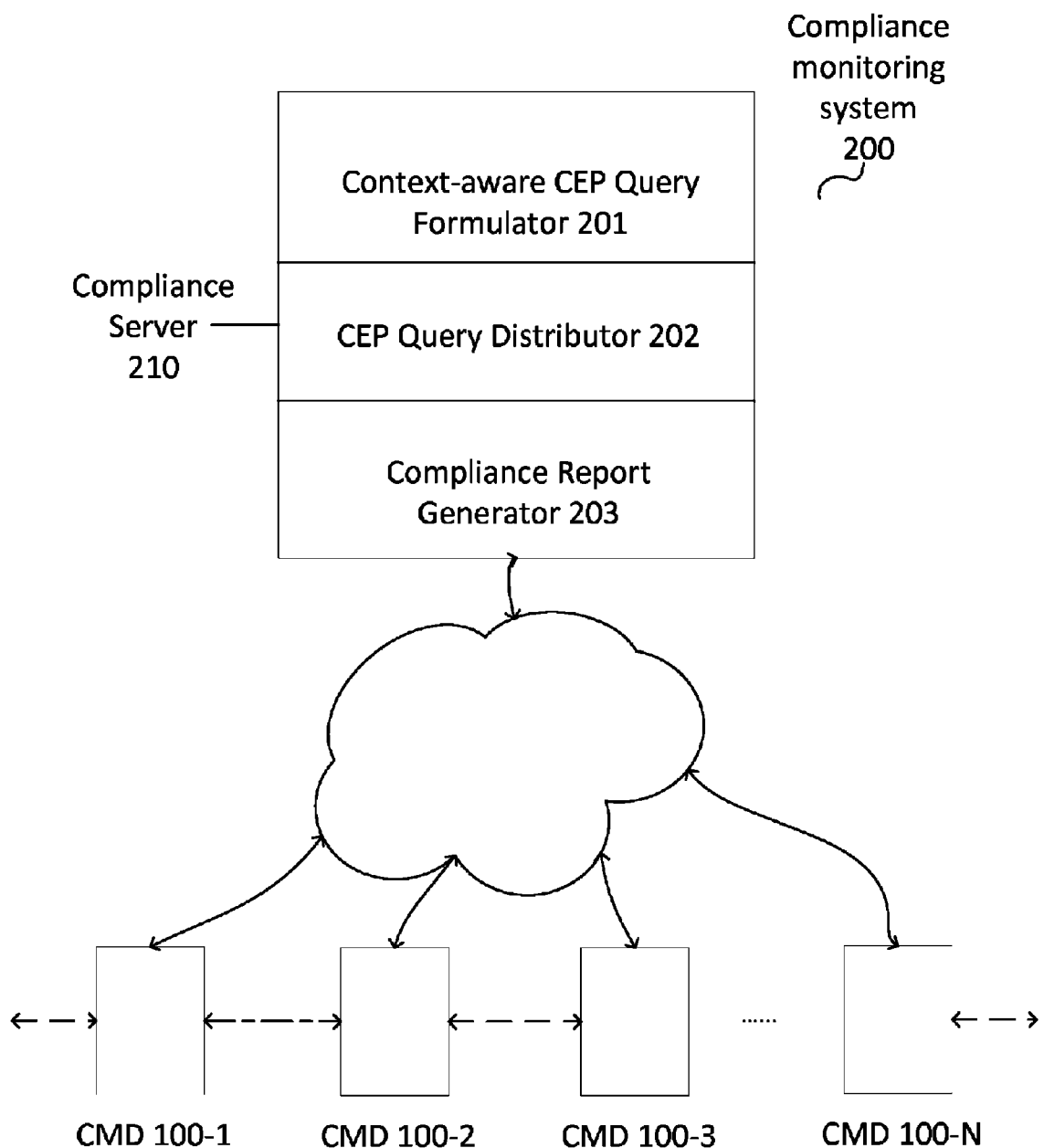
FIG. 2 illustrates an example of a compliance monitoring system, which comprises a plurality of compliance monitoring devices.

FIG. 2 illustrates an example compliance monitoring system 200, which includes Compliance Server 210 and one or more CMDs 100 illustrated in FIG. 1, such as CMD 100-1, CMD 100-2, CMD 100-3, . . . , to CMD 100-N. It is contemplated that the quantity of CMDs 100 in compliance monitoring system 200 can vary. As an example and not by way of limitation, Compliance Server 210 communicates with any or a group of CMDs 100 via any network medium supported by CMDs 100, such as an ad hoc network, a PAN, a LAN, a WAN, a MAN, a BAN, Bluetooth, or one or more portions of the Internet or a combination of two or more of these. The communications may take various other communication mediums/protocols. One or more portions of one or more of these networks may be wired or wireless.

In one embodiment, each CMD 100 registers with centralized computing system 210. In another embodiment, one CMD 100 can be selected to serve as a coordinator to coordinate the other CMDs 100 and/or manage compliance monitoring system 200. During registration of each CMD 100, Compliance Server 210 establishes a record for the registered CMD 100 recording information of the HCW associated with this CMD 100 such as name, ID, job title, profile, designation, etc., and information of CMD 100 itself such as device ID, network address, etc. During the registration process, each CMD 100 negotiates with compliance monitoring system 200 the network medium and protocols that can be used for further communication.

Compliance Server 210 comprises a Context-aware CEP Query Formulator 201, a CEP Query Distributor 202 and a Compliance Report Generator 203. Context-aware CEP Query Formulator 201, CEP Query Distributor 202 and Compliance Report Generator 203 may also reside on separate computing systems. Context-aware CEP Query Formulator 201, CEP Query Distributor 202 and Compliance Report Generator 203 may also form one single unit that carries out combined functions. In one embodiment, Context-aware CEP Query Formulator 201 is configured to formulate compliance CEP queries adaptively according to recognized context of the environment and the specific monitored individual, CEP Query Distributor 202 is configured to send the formulated compliance CEP queries to each CMD 100. Compliance Report Generator 203 is configured to generate compliance report for further analysis.

In one embodiment, Context-aware CEP Query Formulator 201 performs ontology-driven translation to map general compliance query terms to actual and/or specific events, steps or procedures. The ontology-driven translation incorporates unique terms of an individual industry, based on its domain ontology, into the CEP queries to bridge the syntax and semantics of the queries. For example, when compliance monitoring system 200 is deployed in a hospital, medical ontology is utilized to map general compliance query terms into health care specific events or steps. Term "Disinfect" of Compliance Query Q1 of FIG. 12 is translated to events such as "hygienic hand wash" or "hygienic hand disinfection." In another embodiment, general terms are translated to synonymous ones. Term "Disinfect" may also be substituted with the disjunction of terms such as "Handwash OR Sanitize," Context-aware CEP Query Formulator 201 may further map general terms to a sequence of specific events. For instance, while disinfection is required for multiple procedures, various disinfecting methods may be required for each individual procedure. On one hand, hazardous material disposal requires a HCW to disinfect by going through a sequence of steps—antibacterial hand wipe followed by micro-encapsulation absorbent, and finishing up with usual hand wash. A corresponding Compliance Query Q2 is illustrated in List 1202 in FIG. 12. On the other hand, any one of such disinfecting methods will suffice for having a break in the break room. A corresponding Compliance Query Q3 is illustrated in List 1203 in FIG. 12.

Figure 6:
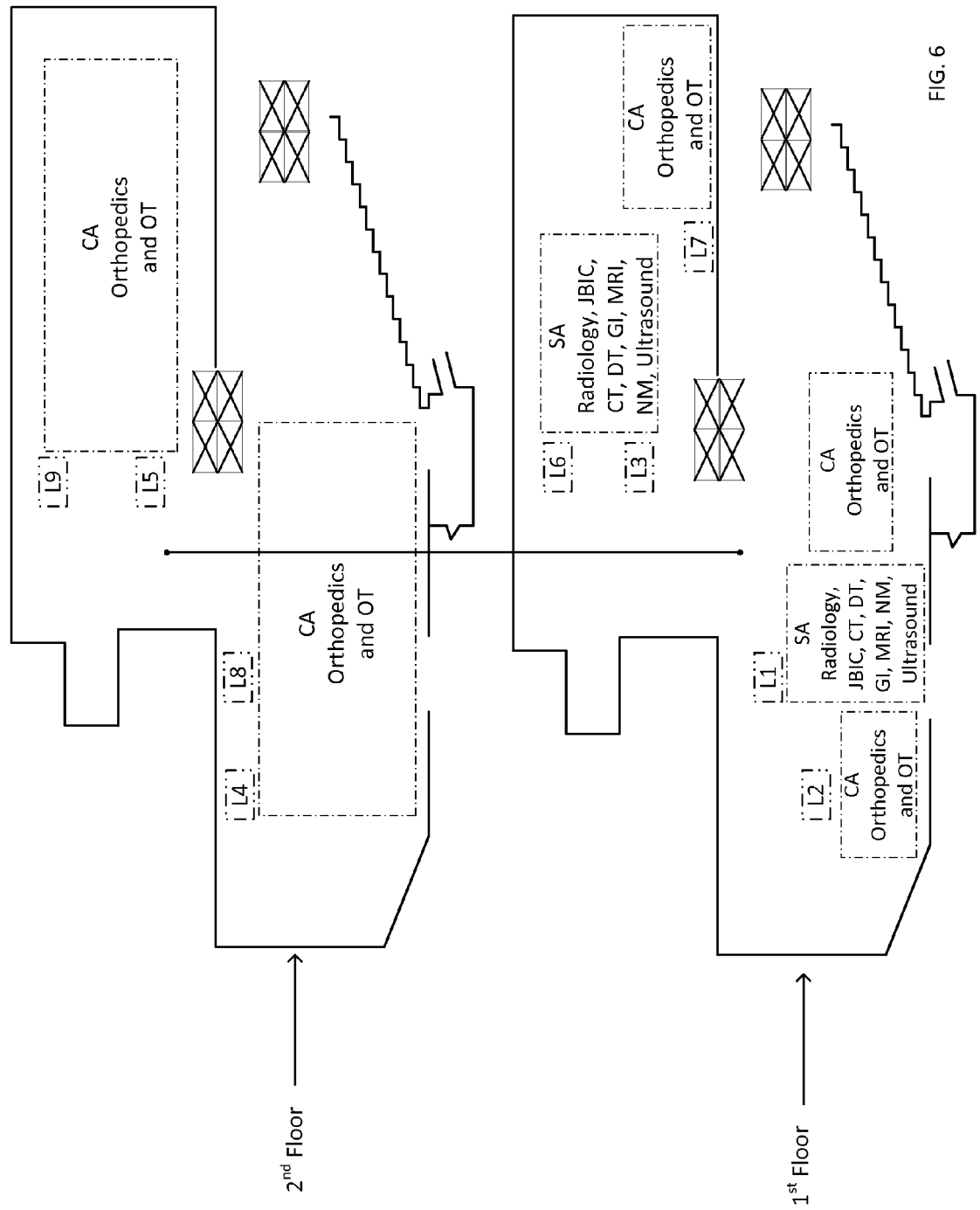
FIG. 6 illustrates an example of designating specific locations of a hospital to more generic areas based on the structure and/or settings of the environment.

In one embodiment, Context-aware CEP Query Formulator 201 translates specific events to more generic events based on the structure and/or settings of the environment. For example, a hospital may designate some units (e.g., floors, buildings and areas) as contamination areas (CA) and others as sensitive areas (SA). FIG. 6 provides an example of such designation. In FIG. 6, Radiology, Joe Buck Imaging Center (JBIC), CT, Diagnostic Testing (DT), GI, MRI, Nuclear Medicine (NM) and Ultrasound are marked as SAs, while Orthopedics and OT are marked as CAs. Correspondingly, "Exit OT" is mapped to "Exit CA" and "Enter ICU" is mapped to "Enter SA" when formulating a compliance CEP query. List 1204 illustrates how such mapping changes the parameters of Compliance Query Q1 of List 1201 to Compliance Query Q4.

In one embodiment, Context-aware CEP Query Formulator 201 maps the logic of compliance CEP query events to physical locations. For example, to capture each disinfect event, the HCW's location at one of the disinfectant dispensers, washrooms, etc. must be detected. If five dispensers on one floor of the hospital are labeled as sanitizers, the HCW can be deemed as already disinfected if there is a determination that she was at either one of these five dispenser locations within specified time period. Knowledge of the floor plan of a hospital may be used to properly associate the compliance CEP query events with the physical locations. FIG. 6 shows that locations labeled as L1, L6, L7, L8 and L9 host sanitizers, and locations labeled as L2, L3, L4 and L5 provide hand washing. Accordingly, event "Disinfect" is mapped to one or a list of such locations. Once a mapping between each specific term and the corresponding physical location(s) is developed, the logic of the compliance CEP query may be translated into terms of the potential physical locations. List 1205 of FIG. 12 illustrates such a translation where "Hand wash" is translated into a range of locations {L2, L3, L4, L5} in Compliance Query Q5.

In one embodiment, Context-aware CEP Query Formulator 201 may also formulate compliance CEP queries leveraging profile information. While every CEP query can be directly associated with an individual, it can also be associated with a group of individuals who are governed by similar compliance requirements. For example, a compliance rule that requires completion of disinfection within 10 minutes after leaving an OT but before entering an ICU is applicable to any HCW who is a practitioner, a head nurse, a registered nurse, a nurse, a nurse practitioner, a medical secretary, a medical technologist, etc. There are other compliance rules that may apply to the same group of HCWs. Therefore, it is reasonable to classify these HCWs into one group, and maintain a relationship between the compliance CEP queries and such a group. Various data formats and association rules can be applied to indicate such a relationship. Also, a number of factors and rationales may be considered when clustering individuals into groups. Groups can be labeled in any manner that is meaningful to the industry or the domain. In one example, groups are referred to as profiles.

Figure 3:
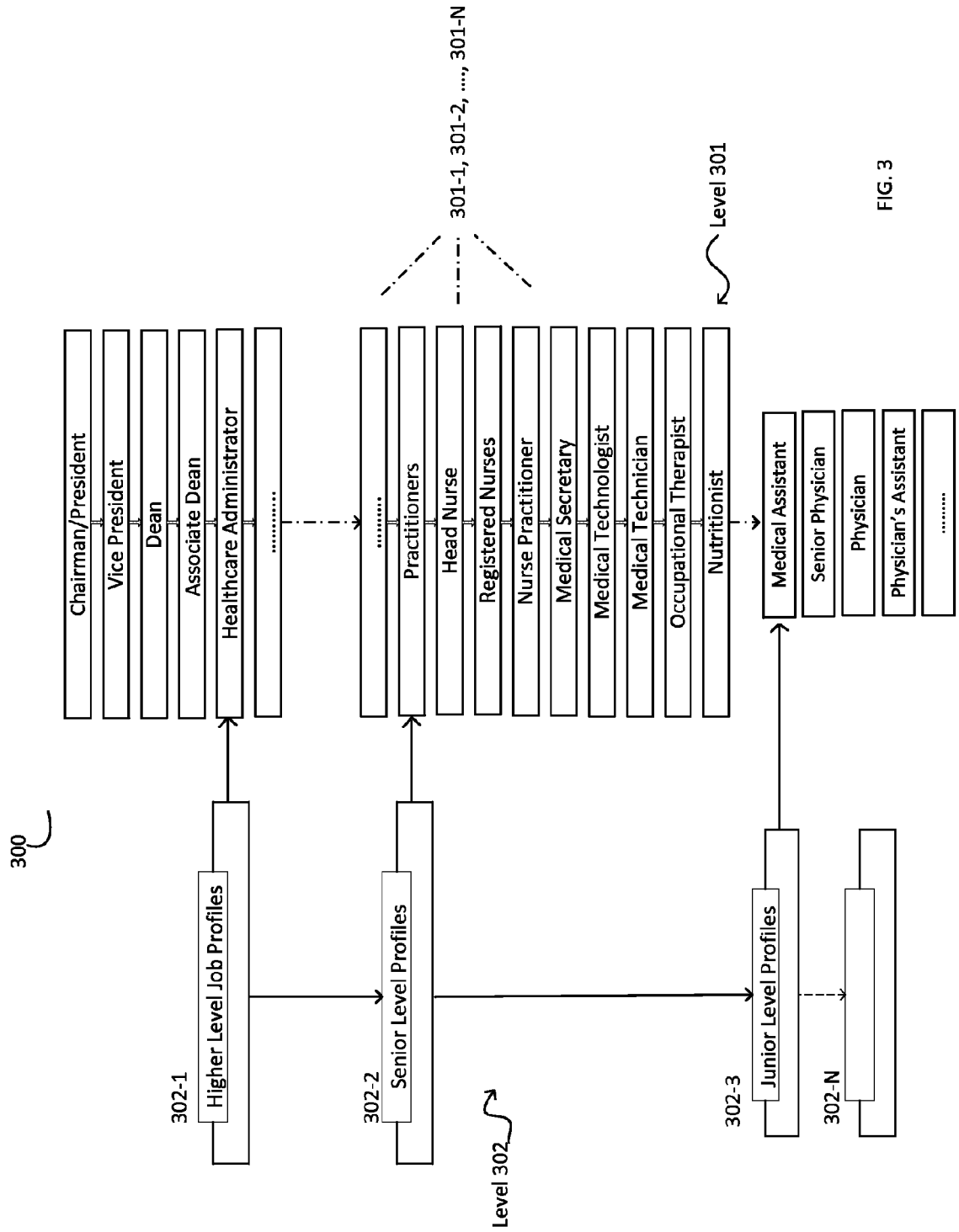
FIG. 3 illustrates an example of profile-aware CEP Query Formulation.

FIG. 3 illustrates one embodiment of profile based hierarchical compliance CEP query formulation. Staffs of Hospital A are modeled to a hierarchical structure 300, which has two levels. Level 301 has a plurality of items 301-1, 301-2, . . . , to 301-N, where every Level 301 item represents a specific designation, responsibility or job title within the hospital. Level 302 comprises a plurality of items 302-1, 302-2, . . . , to 302-N, where each one of Level 302 items represents a profile that is formed by clustering certain Level 301 items into one group. For example, Level 301 items Practitioners, Head Nurse, Registered Nurses, Nurse Practitioner, Medical Secretary, Medical Technologist, Medical Technician, Occupational Therapist and Nutritionist are grouped together to generate a "Senior Level Profile." "Higher Level Job Profile" and "Junior Level Profile" are formed in a similar manner to include distinctive groups of Level 301 items. While FIG. 3 shows only two levels in the hierarchy, one skilled in the art will appreciate that additional levels may be created by further grouping Level 302 items together. Also, Level 301 items can be profiles as well. Hospital A has the flexibility to update the profile hierarchy, to add, remove and modify the number of levels, the number of items of each level, and how the items of one level associates with items of another level.

Context-aware CEP Query Formulator 201 maintains a record of the correlation between compliance CEP queries and profiles. For example, such a record may indicate that Compliance Query Q1 of List 1201 of FIG. 12 is applicable to people classified into Profiles P1, P2 and P3 (Q1 [P1, P2, P3]), while Compliance Query Q2 of List 1202 of FIG. 12 is applicable to people of Profiles P2, P3 as well as Profile P4 (Q2 [P2, P3, P4]). Alternatively, the record may indicate that individuals belonging to Profile P1 are regulated by Compliance Query Q1 only (P1 {Q1}), while individuals of Profile P2 is governed by both Compliance Queries Q1 and Q2 (P2 {Q1, Q2}). In one embodiment, Context-aware CEP Query Formulator 201 updates every compliance CEP query to reflect the profile information, as illustrated by Compliance Query Q6 of List 1206 of FIG. 12. Compliance Query Q6 indicates, by introducing parameter "PROFILE," that it is applicable to all HCWs that belong to Senior Level Profile 302-2 of FIG. 3.

Meanwhile, a particular compliance CEP query can be assigned to a specific profile at any granularity of the profile hierarchy. List 1207 of FIG. 12 indicates that Compliance Query Q7 requires performance of a series of steps after the recycling procedure but before entering an OT. Parameter "DESIGNATION" of Compliance Query Q7 specifies that this query applies only to Medical Assistants, a selected group of hospital staffs. Accordingly, Compliance Query Q7 is distributed to only CMDs 100 of these individuals whose responsibilities are designated as Medical Assistants.

A fixed value of the time window size, provided by WITHIN clause of a compliance CEP query, may lead to erroneous compliance determination. Failing to recognize the dynamic situation and factors around the monitored HCW may cause both false positives and false negatives. For example, while it usually takes about 10 minutes for HCW A to walk from OT A to ICU A with completion of the required disinfection procedure, it may take much longer time when she assists a patient to return to the medical ward on her way to ICU A. In this scenario, CEP engine 105 would have found no "Exit OT" event in the 10 minutes time period prior to the "Enter ICU" event. Accordingly, no violation is detected even HCW A fails to disinfect after assisting the patient, which leads to a false negative. For another example, HCW A may walk really fast or OT A and ICU A are very close to each other that within 10 minutes from exiting OT to entering ICU, she did complete disinfection. However, she helped a patient afterwards before entering ICU A. CEP engine 105 would have determined that she has complied with the procedures as disinfection did take place between "Exit OT" and "Enter ICU" within 10 minutes. These problems may not be easily resolved by changing the syntax of the EVENT clause of compliance CEP queries. Compliance Query Q8 shown in List 1208 of FIG. 12 illustrates that CEP engine 105 may provide false positive violations when HCW A did disinfect but simply spent time longer than 5 minutes in doing it.

Figure 5:
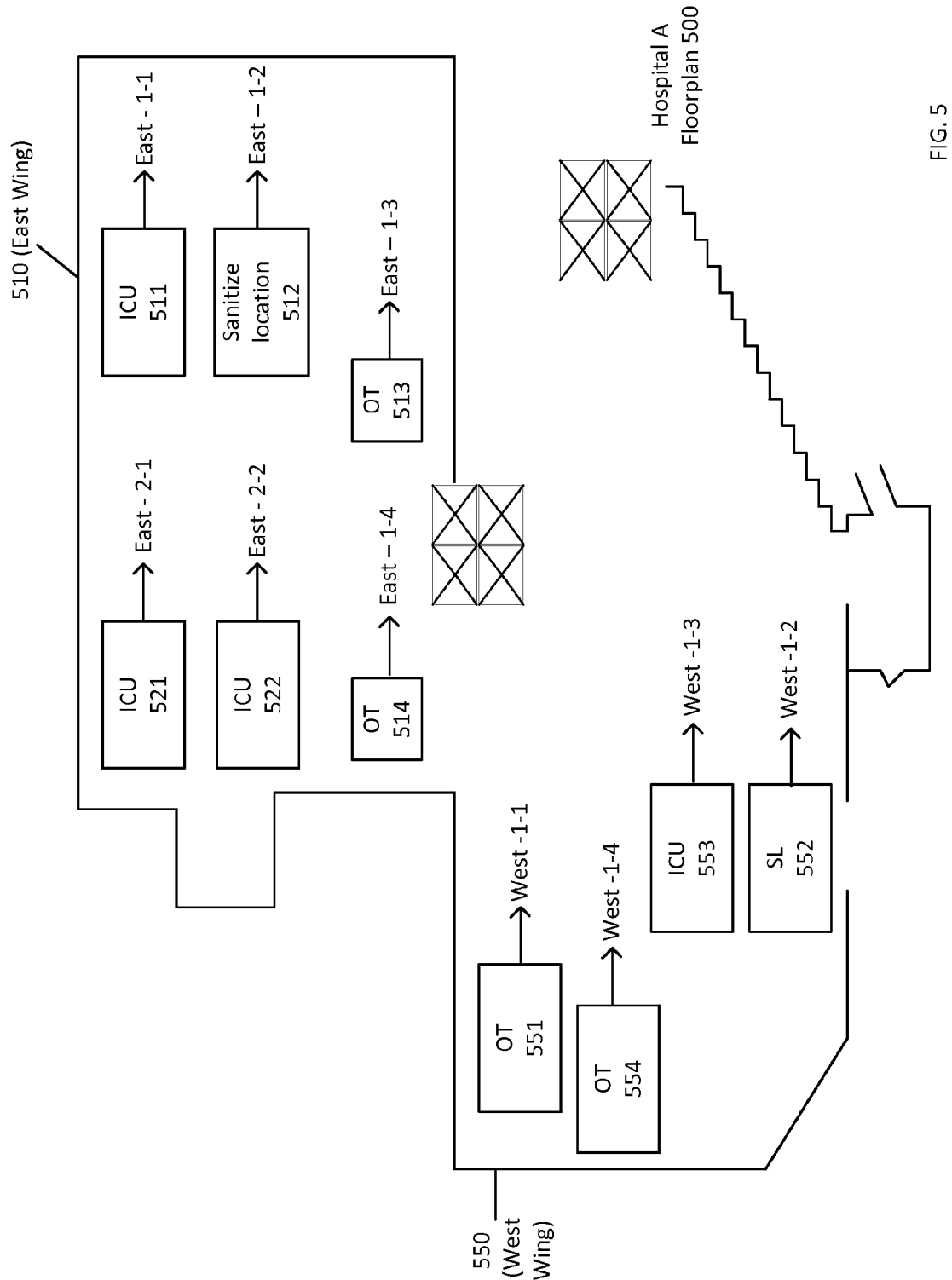
FIG. 5 illustrates an example of a floor plan of a hospital.

The false negative and false positive problems may also be caused by the physical locations associated with the monitored events. As illustrated in FIG. 5, there are noticeable time differences between moving within a wing and moving from one wing to another, or between moving on the same floor versus moving between floors. Therefore, it is critical to build compliance queries with the time window size parameters adapting to such contextual data so that the compliance monitoring process can make more accurate violation determinations.

According to various embodiments, Context-aware CEP Query Formulator 201 further formulates compliance CEP queries by introducing additional parameters and clauses, and adapting the value of the WITHIN clause, based on the hospital floor plan and/or crowd sourced data. The crowd sourced data, collected from all HCWs, not necessarily limited to those whose compliance status will be monitored by the compliance monitoring system 200, and/or collected from non-HCWs, provide movement information between any particular locations. The crowd sourced data may be gathered by centralized computing system 210, or my be collected by a server that is external to compliance monitoring system 200 and shares data with Compliance Server 210. The crowd sourced data may be assembled prior to the compliance monitoring process or gradually built during the compliance monitoring process. The crowd sourced data may be transmitted from CMDs 100 or other type of devices associated with individual HCW or people of interest to the compliance monitoring system 200.

In one embodiment, Context-aware CEP Query Formulator 201 estimates time window sizes based on the floor plan and adapts the compliance query parameter accordingly. Following the hospital floor plan, Context-aware CEP Query Formulator 201 understands the overall size of the hospital, locations of various units, and the transportation measures and access paths available between any two locations. FIG. 7A illustrates that time window sizes are suggested based on the relevant access distance between two locations, the source location and the destination location. While the correlation between the time window size suggestion and the source-destination relationship is demonstrated in a table format, it will be appreciated that such correlation can be represented in any other feasible formats. Table 701A includes at least two columns, a Source-Destination Relationship column 710A and a Suggested Time Window Size column 720A. Table 701A provides time window size suggestions for four scenarios considering some combination of wings and floors. Entries 702N~705A provide that a 5-minute time window size is suggested when two locations are within the same wing and on the same floor, a 10-minute time window size for both situations where locations are in different wings but on the same floor and where locations are within the same wing but on different floors, and a 15-minute time window size for locations in different wings and on different floors. Accordingly, Compliance Query Q1 of List 1201 of FIG. 12 is adapted to multiple compliance queries. Compliance Query Q9 of List 1209 and Compliance Query Q10 of List 1210 of FIG. 12 reflect the data provided by entries 702A and 703A, respectively. Both queries comprise additional parameters of OTWING, ICUWING, OTFLOOR and ICUFLOOR, and their relationships.

Similarly, the time window size suggestions can be further tuned to support additional conditions that may affect the average time needed to move from the source location to the destination location, such as whether there are elevators, stairs, fast-pass corridors, etc. between locations. List 1211 of FIG. 12 illustrates Compliance Query Q11, which provides a variation of Compliance Query Q10 of List 1210 of FIG. 12 with various time window size option indicating that more time is required when there is no direct path linking the OT unit and the ICU unit.

In another embodiment, Context-aware CEP Query Formulator 201 estimates time window sizes based on both the floor plan and crowd sourced movement data, and adapts the compliance query parameters accordingly. FIG. 7B illustrates that time window size suggestions are further adjusted based on general observations of movement speed between two locations. Table 701B shows that for the same types of source-destination relationship as 702A and 703A, the suggested time window size may vary because of the movement speed. The movement speed is estimated based on crowd sourced data of a group of people, who have moved from such specific sets of source-destination, for a certain time period. While entries 703B and 705B have the same time window sizes suggestions as entries 702A and 703A when the movement speed is deemed as Brisk Walking (BW), 702B and 704B demonstrate that the time window sizes are increased for Slow Walking (SW). Compliance Queries Q9 and Q10 of FIG. 12 are, thus, further adapted to Compliance Queries Q12 and Q13, which are illustrated in Lists 1212 and 1213 of FIG. 12, respectively.

While the learning and movement time estimation between two locations are performed by Context-aware CEP Query Formulator 201, it will be appreciated that these can be performed by other units of the Compliance Server 210 of FIG. 2, or provided by units on a different server. It will be further appreciated that such learning and estimation can be regularly updated to reflect the latest change of the floor plan and the updated crowd sourced movement data.

In one embodiment, CEP Query Distributor 202 is configured to distribute compliance CEP queries formulated by Context-aware CEP Query Formulator 201 to each registered CMD 100, based on the profile hierarchy illustrated in FIG. 3 and the records established at Compliance Server 210 via the registration process. A group of compliance CEP queries is distributed to the HCW's CMD 100 based on a match of her position or job title to the profile hierarchy. For example, HCW A, who is a Registered Nurse, has a profile matching "Sensor Level Profile" 302-2. Accordingly, Compliance Query Q6 of List 1206 of FIG. 12, which is a compliance CEP query that is applicable to all "Senior" level HCWs, is distributed to CEP engine 105 of her CMD 100. In one embodiment, when distributing a set of compliance queries to an individual HCW's CMD 100, the CEP Query Distributor 202 also distributes the ontology information and the floor plan associated in formulating the compliance queries. In another embodiment, Context-aware CEP Query Formulator 201 and CEP Query Distributor 202 are integrated into one unit.

According to various embodiments, upon receipt of the set of compliance CEP queries distributed from CEP Query Distributor 202, CEP engine 105 residing on CMD 100 starts running the compliance CEP queries continuously to monitor real-time violations, to provide notification or alert upon detection of compliance violation, and to transmit certain compliance status to Compliance Server 210. The received set of compliance CEP queries can be stored by CEP engine 105 or storage 106. CMD 100 also constantly captures a stream of contextual data of the HCW via sensors 110, when she carries her CMD 100 within the premises of the hospital. Sensor data captured includes, but not limited to, location, speed and time associated with the HCW's movement. Captured data and its interpretation are saved in storage 106 of CMD 100. Such data may be logged in various storage formats such as files, a distributed database, or other types of equivalent systems. The data can be recorded as texts, tables, XML files, JSON objects, etc.

Figure 8:
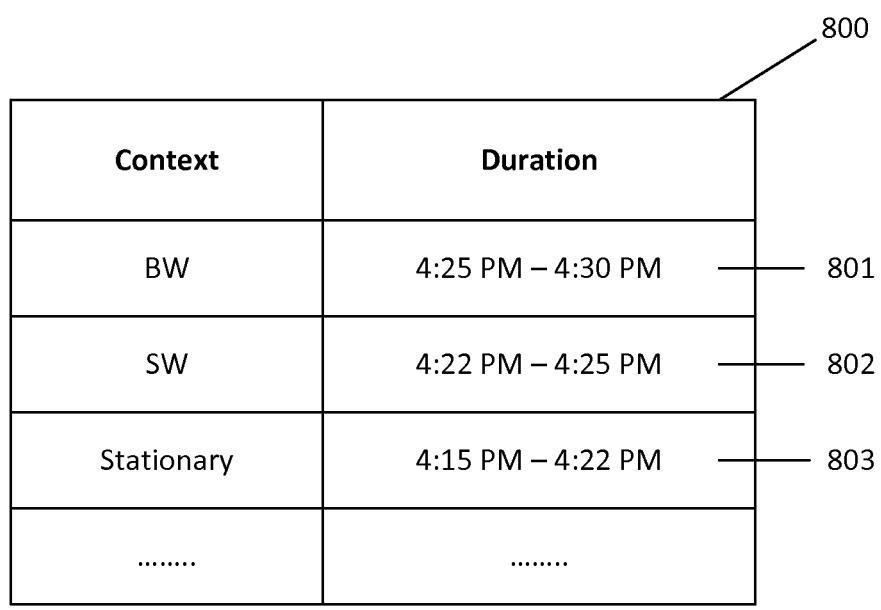
FIG. 8 illustrates an example of data logs of an individual's movement status.

In one embodiment, sensors 110 provide movement speed information of the HCW. The HCW's speed can be determined by the accelerometer, or by detecting to which Bluetooth or WiFi devices CMD 100 is connected. For example, accelerometer can be used to estimate walking speed using machine learning algorithms such as regularized kernel methods. Also, GPS and accelerometer can be combined to further reduce walking speed estimation errors. Based on her walking speed, her movement is further categorized as brisk walk (BW), slow walk (SW), Stationary, etc. Table 800 of FIG. 8 illustrates that both the style of the movement and the duration of the movement are logged. For example, entries 801~803 provide that the HCW has not moved from 4:15 PM to 4:22 PM, walked slowly subsequently until 4:25 PM, and moved briskly from 4:25 PM to 4:30 PM.

Figure 4:
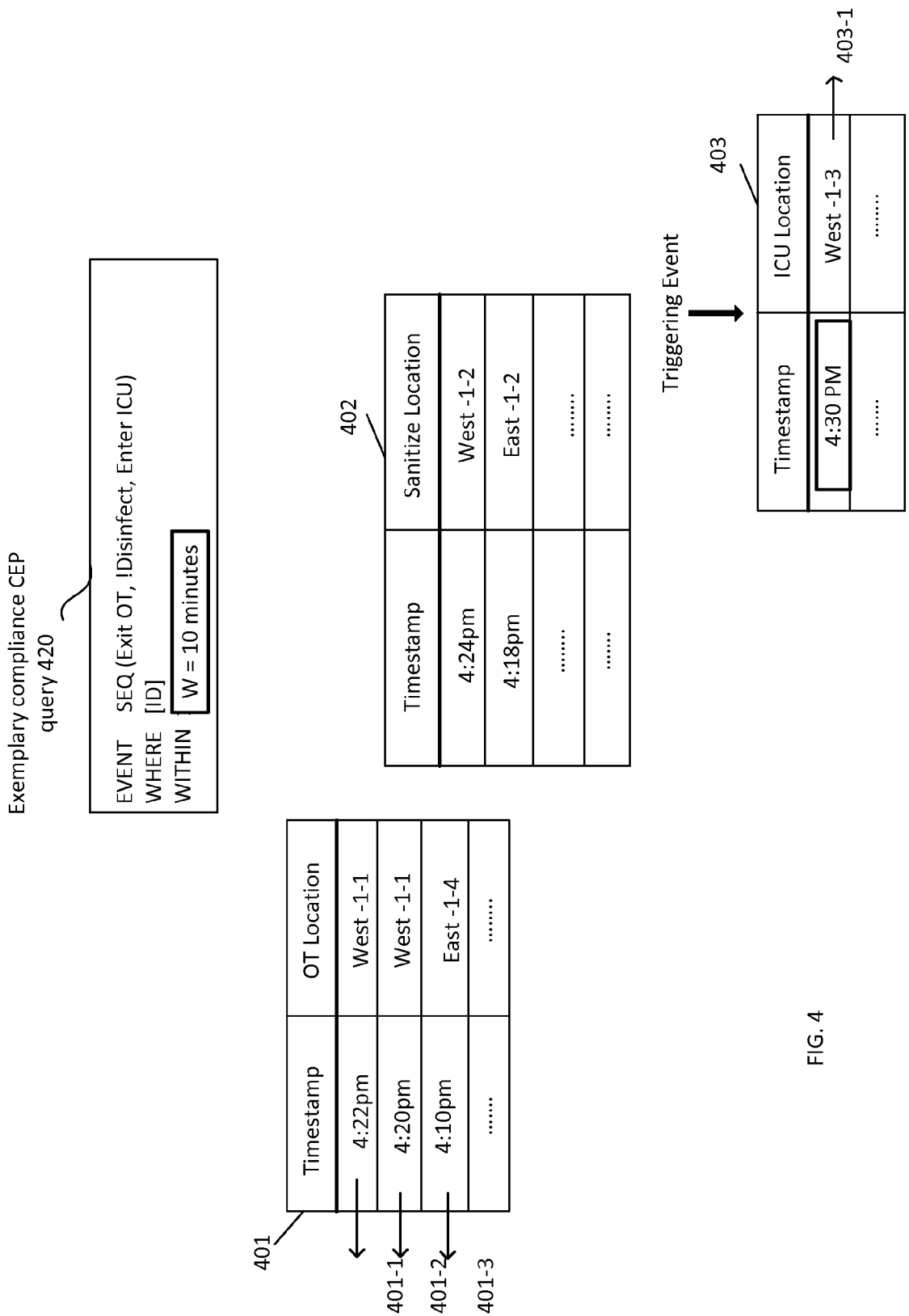
FIG. 4 illustrates an example of event logs of a compliance monitoring device.

In another embodiment, sensors 110 track the location changes of the HCW. FIG. 4 illustrates a subset of such movement data that is saved into a number of tables. Every table includes a Timestamp column and a Location column. Therefore, each table is designated to record one type of location, and every row of the table records when the HCW is at a particular position of such a location type. The value of the Timestamp field can assume any formats. For example, an international standard (e.g. ISO8601, etc.) covering the exchange of date and time, a system specific time representation, and/or a user-defined time and date system can be used. The value of the Location field can be saved as a string, a text array, etc.

The tables are created based on events provided by compliance CEP queries. Therefore, the total number of tables and the type of location recorded by each table is partially determined by parameters of corresponding compliance CEP queries. A location that does not match to an event of any compliance CEP query may not be logged.

Moreover, CEP engine 105 may hold information as to which table saves triggering events. The information of triggering events may also be held in a separate log table managed by CEP engine 105. An entry added to a table recording triggering event will invoke CEP engine 105 to run corresponding compliance CEP queries. Additional columns may be included in the log table to record further details. The number and type of columns for each table are also partially determined by parameters of compliance CEP queries.

In another embodiment, all locations are logged into a single log table, disregarding whether the locations can be associated with events or other parameters of any compliance CEP query. CEP engine 105 holds information of all triggering events. Upon entry of a triggering event, CEP engine 105 is triggered to run associated compliance CEP queries. This single log table may have multiple fields to accommodate different parameters of various compliance CEP queries.

Examples of log tables related to a particular compliance query are illustrated in FIG. 4. The exemplary compliance CEP query 420 has an event sequence of "EVENT SEQ(Exit OT, !Disinfect, Enter ICU)." As previously disclosed, such a compliance CEP query may be adapted to a group of compliance CEP queries based on the floor plan and crowd sourced movement data. FIG. 9 illustrates some of such adapted compliance CEP queries.

In one embodiment, CEP engine 105 maps every event in FIG. 9 to a corresponding type of hospital location. "Enter ICU" is mapped to ICU locations, "Exit OT" to OT locations and "!Disinfect" to Sanitization locations. Three log tables are established to record the HCW's movements at these locations. Table 401 of FIG. 4 records data relevant to the "OT Location," Table 403 holds data associated with the "ICU Location," and Table 402 maintains data pertinent to the "Sanitize Location," Table 403 is marked as a table with triggering events. In one embodiment, log entries are updated at a regular basis, which can be fixed, predetermined or configurable. In another embodiment, a log entry is added into a corresponding table whenever there is a detection of the HCW's presence at that location type supported by the table. FIG. 4 illustrates that new entries are added to the top of the table. However, it will be appreciated that the latest records can be inserted to the bottom of each table, or can be added into the table in any other manners that support searches and modifications.

In one particulate embodiment, Hospital A has multiple OT, ICU and Sanitizing units at various locations. Entries entered into each log table, therefore, bearing the labels provided by Hospital A's floor plan to distinguish one unit of the same type from the other. FIG. 5 illustrates a floor plan 500 of Hospital A. Hospital A complex is a two-story structure with west wing and east wing. Multiple departments or units that offer the same or similar services, or provide alike support, may be located in both wings and on both floors. Correspondingly, each department or unit is distinctively identified based on a unique combination of information of wing, floor and the specific position on the floor. In one embodiment, locations are identified using a format as "wing-floor-sequence." Accordingly, OT 513, which is located near the south wall on the first floor of the east wing, is labeled as "East-1-3," OT 514, which is located near the west wall on the same floor of the east wing, is labeled as "East-1-4." OT 551, which is located at the north-west corner of the first floor of the west wing, is labeled as "West-1-1." Departments or units located on the second floor are labeled as "West-2-x" or "East-2-x," respectively. Hospital A may use other labeling schemas for its floor plan as long as the schema is capable of uniquely identifying each individual location of interest to the compliance monitoring process.

As illustrated in FIG. 4, entries of Table 403 log the time and unit label each time when the HCW is near an ICU unit. The HUN was at the ICU located on the first floor of the west wing at 4:30 PM. Since the floor plan presented in FIG. 5 provides that this ICU unit is labeled as "West-1-3," timestamp "4:30 PM" and ICU Location "West-1-3" are added as entry 403-1 into Table 403. Entries 401-1, 401-2 and 401-3 of Table 401 indicate that the HCW was at OT units in the west wing at 4:22 PM and 4:20 PM, and was at an OT unit in the east wing at 4:10 PM, Table 402 provides that the HCW was at a sanitizer in the west wing at 4:24 PM, and at another sanitizer in the east wing at 4:10 PM.

Figure 10:
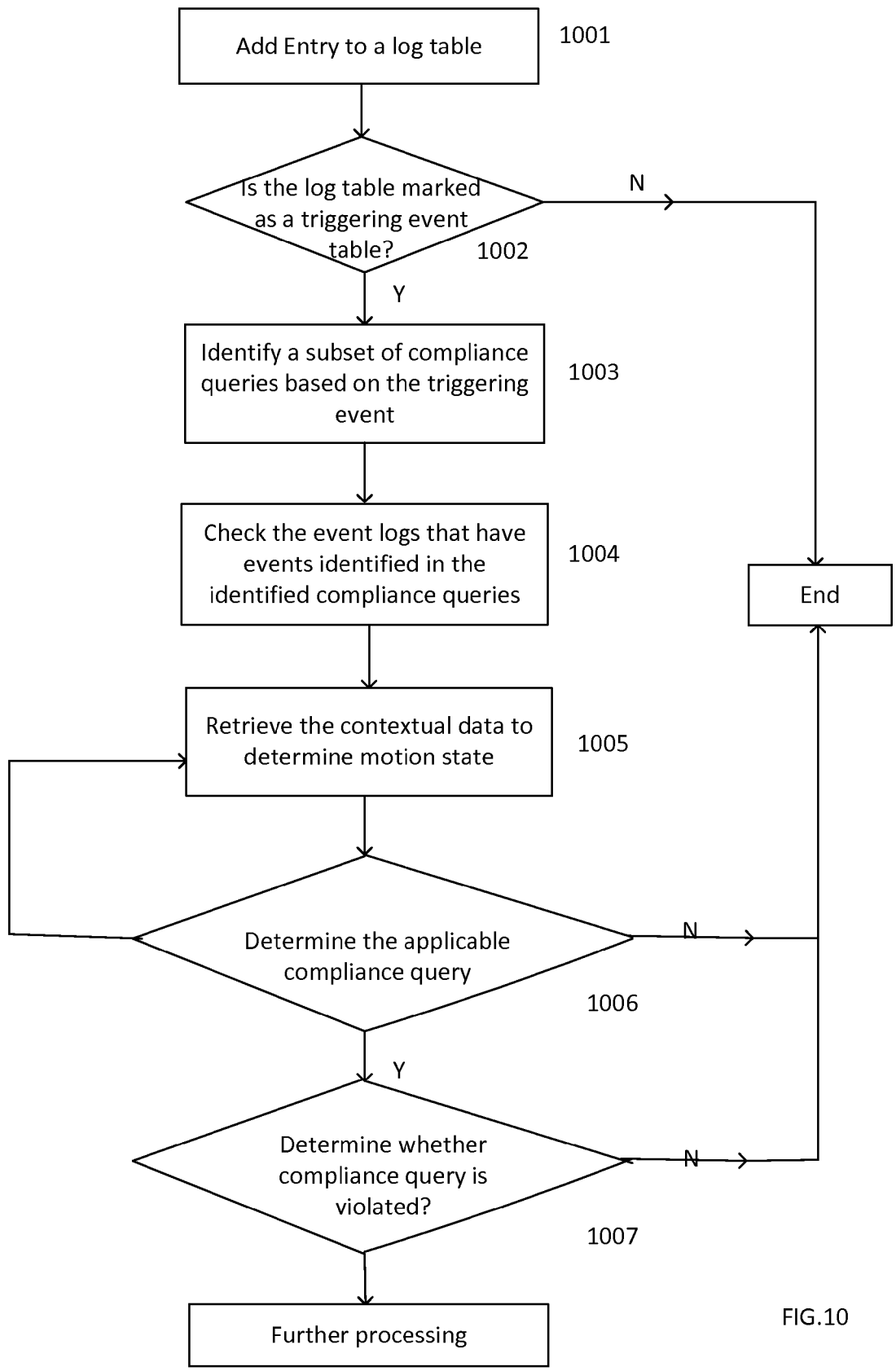
FIG. 10 illustrates an example process for compliance violation monitoring.

FIG. 10 illustrated the steps of one embodiment of compliance monitoring process. At step 1001, when the HCW is about to enter an ICU, an "Enter ICU" event is logged by the storage unit 106 by adding entry 403-1 into Table 403. The entry shows that the arrives at the ICU unit labeled as West-1-3 at 4:30 PM. At step 1002, CEP engine 105 checks to see whether Table 403 has been marked as a table recording one type of the triggering events. Upon recognizing that Table 403 stores triggering events, CEP engine 105 proceed to step 1003 to identify a subset of compliance CEP queries based on the triggering event supported by Table 403. As the triggering event is "Entering ICU," compliance CEP queries illustrated in FIG. 9 are identified as the candidates for further processing. The syntax of these identified compliance CEP queries provide that "Exit OT" and "Disinfect" events must be checked for a triggering "Entering ICU" event. Based on the correlation of locations and events, at step 1004, CEP engine 105 checks both Table 401 and Table 402, which are illustrated in FIG. 4, for location and time data associated with OT and Disinfect events, respectively.

The time window size parameter, specified by the WITHIN clause of a compliance CEP query, plays an important role in controlling how streaming data is processed and how compliance violation is detected. Each one of the compliance CEP queries in FIG. 9 has a predetermined fixed value of the time window size, which calls for CEP engine 105 to determine whether an "Exit OT" event happened within the specified time window prior to the "Enter ICU" event, and whether a disinfection event has taken place between the time of the "Exit OT" event and the time of the "Enter ICU" event. As previously disclosed, the time window size of each such compliance CEP query has already adapted based on the relevant location relationships of locations associated with the events, and the HCW's movement status.

At step 1004, following the sequence of events defined in the compliance CEP queries of FIG. 9, Table 401 is checked first. Table 401 indicates that the last time the HCW was around an OT unit at a time earlier than the latest record of Table 403 was at 4:22 PM at OT unit West-1-1. Because both the OT unit and the ICU unit are located on the first floor of the west wing, compliance CEP queries List 901 and List 902 of FIG. 9 are selected. However, these two compliance CEP queries have different time window sizes based on how fast the HCW moves. CEP engine 105 needs to further narrow down the compliance CEP query selection.

Therefore, at step 1005, CEP engine 105 checks Table 800 of FIG. 8 to determine the HCW's movement status. Table 800 indicates that the HCW walks fast from 4:25 PM to 4:30 PM, but slowly from 4:22 PM to 4:25 PM. Based on such information, CEP engine 105 determines the average motion state of the HCW during the time period from 4:22 PM, when she left the OT unit, to 4:30 PM, when she arrives at the ICU unit. In one embodiment, CEP engine 105 determines that the HCWs motion state in this time period is SW. At step 1006, therefore, CEP engine 105 makes the final selection that compliance CEP query List 902 is to be processed for compliance violation detection.

At step 1007, CEP engine 105 determines whether the HCW has complied with the regulation by checking Table 402 based on the time window size of 10 minutes provided by compliance CEP query List 902. As Table 401 already provides that the last time the HCW was at an OT location within the time window size of 10 minutes is at 4:22 PM, Table 402 is checked for a time between 4:22 PM and 4:30 PM for completion of disinfection. Entry 402-1 confirms that the HCW has completed the required disinfection procedure since at 4:24 PM, she was at a Sanitizer labeled as "West-1-2." Therefore, all requirements imposed by compliance CEP query List 902 have been satisfied and no compliance violation is detected for this ICU triggering event.

In another embodiment, at step 1005, CEP engine 105 determines that the HCW's motion state is BW, and compliance CEP query List 901 becomes the finalized selection at step 1006. However, there is no OT log recorded at a time between 4:25 PM and 4:30 PM, as required by the time window size of 5 minutes. CEP engine 105 may either go back to step 1005 to recalibrate or will exit the process until the next triggering event is entered.

It will be appreciated that same or equivalent steps can be carried out when there is only one single log table recording all locations.

In one embodiment, upon detection of one or more compliance violations, alerts or notifications are triggered to be displayed at the HCW's CMD 100. The alerts can be displayed in one or a plurality of modes including, but not limited to, audible sound (e.g., beep, ring, notification tone, spoken message, etc.), visual indicator (flashing, color variation, illumination variation, text, image, motion variation of content presently displayed, etc.), and/or tactile or haptic notion (e.g., vibrate). In one embodiment, some alerts are configured to cause a motion (e.g., angle or orientation change, etc.) of CMD 100. In one embodiment, the alerts are presented to the HCW via output interface 101 of CMD 100.

Figure 11A:
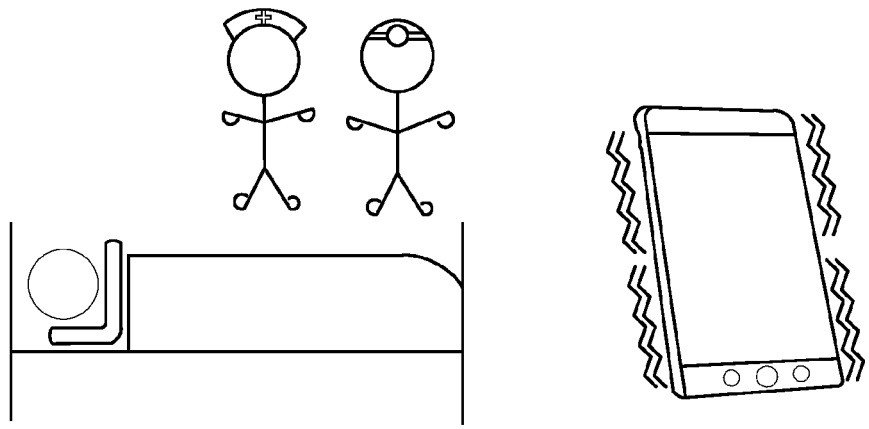
FIGS. 11A-11F illustrate examples of privacy preserving context-aware compliance violation notifications.
Figure 11B:
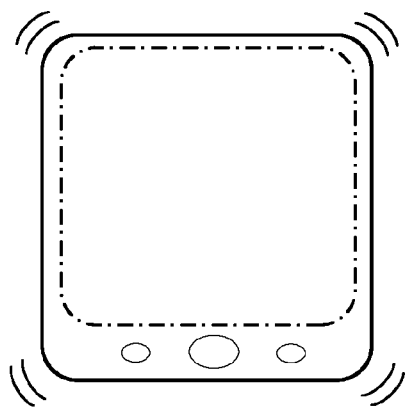
Figure 11C:
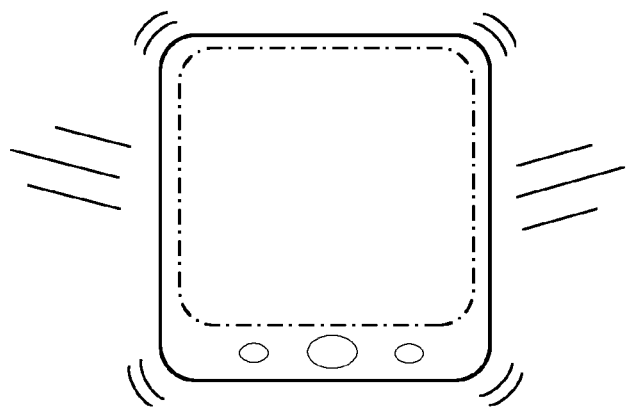

FIGS. 11A~F illustrate a context aware alert generation, delivery and presentation method. Based on the context (location, time, movement state, proximity, etc.) of the HCW, the compliance violation alerts are delivered using different modes. FIG. 11A shows that an alert for not wearing gloves when administering injection is provided to the nurse in a vibrate mode when sensors 110 of her CMD 100 detect that she is on duty with a doctor (e.g., detected by Bluetooth pairing between CMDs and location information). FIG. 11B demonstrates that for the same type of violation, an audio alert reminding her to complete the required steps is presented when the nurse is alone. FIG. 11C illustrates that a combination of alert modes is utilized. CMD 100 starts flashing and beeping, when there is a determination that the HCW has not put on required surgical gloves.

Figure 11D:
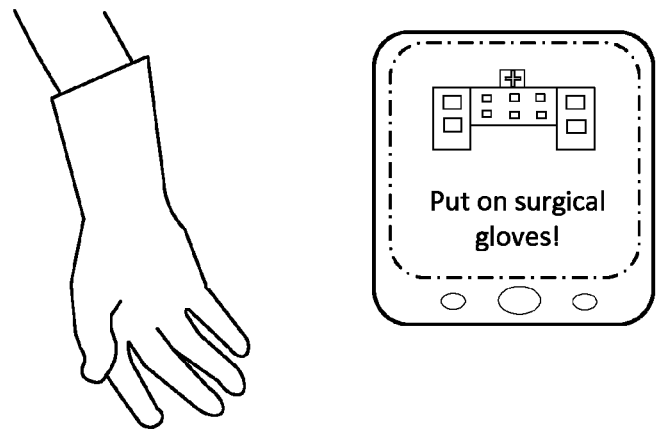
Figure 11E:
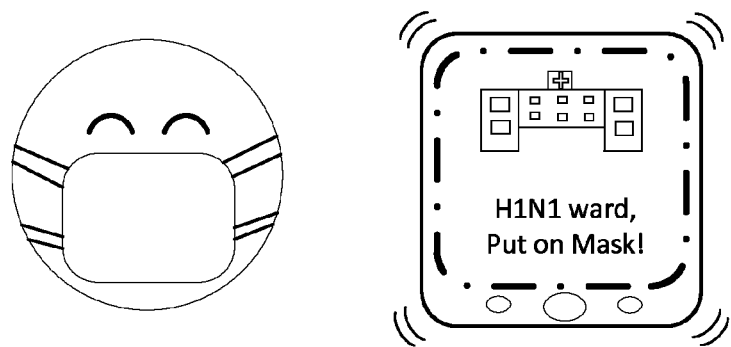

In one embodiment, different levels of warnings are generated based on the gravity of the detected violation. The compliance CEP queries are categorized as high, medium and low violation levels at the time they were formulated by Context-aware CEP Query Formulator 201. Discrete alert mode is assigned to each level of violation. For example, high level violations result in instantaneous alerts with notification tones or voice alerts. On the other hand, medium and low level alert notifications are provided in vibrate mode only. Two exemplary alerts are depicted in FIGS. 11D and 11E. Not putting on surgical gloves is deemed a medium level violation for medical assistants dealing with surgical equipment. In FIG. 11D, an alert for such a violation is presented at CMD 100 leveraging text message with a yellow color background. However, for an on-duty doctor visiting different wards, not wearing mask before entering a ward with H1N1 patients is categorized as a high level violation. In FIG. 11E, an alert for this violation is presented at CMD 100 leveraging both audio and text messages, while the text message is displayed with a red color background.

Figure 11F:
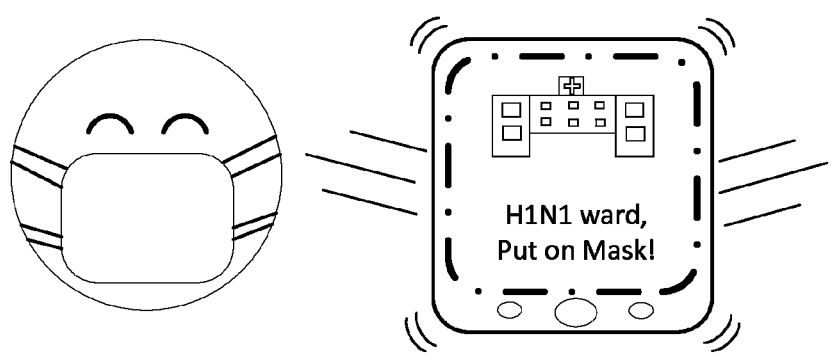

In one embodiment, alert mode migrates from one to the other if a violation has not been timely addressed. In FIG. 11F, CEP engine 105 requests a switch of the alert mode from the one illustrated in FIG. 11E to one combining audio message and text message with a flashing red light, if the HCW hasn't put on a mask within a specified time, which is determined based on the level of alert gravity.

In one embodiment, instead of uploading each individual compliance violation with associated raw event data to a centralized Compliance Server 210 of FIG. 2, an aggregated compliance report is periodically uploaded from CMD 100 to Compliance Server 210. The aggregated compliance report can be generated by CEP engine 105, by another unit residing on CMD 100, or by a unit external to CMD 100. The aggregated compliance report can be delivered to a standalone server that is separate from Compliance Server 210.

The aggregated compliance report collects all compliance violation details of an HCW over a certain time period based on the compliance report uploading frequency. In one embodiment, the frequency is adaptive based on one or more factors. In one embodiment, the frequency adapts to the history of the HCW's compliance behavior. For those HCWs with low or no violation history, the compliance reports are uploaded less frequently than those who have been frequent violators. In another embodiment, the frequency adapts to the nature of the areas the HCW moves about. For a HCW that works in more sensitive areas of the hospital such as ICU, OT or hazard disposal, even the slightest violation must be immediately reported. In one embodiment, the frequency depends on a compliance score. A higher score may lead to a more frequent compliance report uploading rate. It will be appreciated that any sorting methods are applicable as long as it provides a systematic manner to determine and distinguish the report uploading frequencies based on the calculated compliance scores. A method to compute the compliance score may take multiple factors into consideration, and assign various weights to each of the factors. Algorithms such as weighted average computation, moving average, exponentially weighted moving average, weighted sum model, multi-criteria decision analysis (MCDA) method, etc. can be implemented to achieve such a calculation using logs of violations together with their severity and frequency of occurrences. The combination of factors and their associated weights can be pre-determined or provided through configuration.

In yet another embodiment, Compliance Report Generator 203 of FIG. 2 may produce further aggregated compliance reports based on various granularities such as for HCWs of the same department, located on the same floor, having the same responsibility, in a similar age group, etc. Such aggregated compliance reports can also be generated for the whole hospital. Aggregated reports for different granularities can be used to analyze compliance status and/or to improve compliance monitoring process.

In one embodiment, based on how the compliance reports are aggregated, a HCW, a department or a specific group based on various grouping criteria, can be rewarded for staying compliant or for improved compliance status. An automated reward points system can be employed such that HCWs with great compliance performance will get rewarded, thus, incentivizing the compliance monitoring. The automated reward points system can be integrated with Compliance Report Generator 203 or can be a discrete unit to Compliance Server 210.

References throughout this specification to "one embodiment" or "an embodiment" mean that a particular structure, feature, function or characteristic described is included in at least one implementation encompassed within the present invention. Therefore, phrases of "one embodiment" or "an embodiment" are not necessarily referring to the same embodiment. Furthermore, the particular structure, feature, function or characteristic may be instituted in other suitable forms other than the particular embodiment illustrated, and all such forms may be encompassed within the claims of the present application.

What is claimed is:

1. A method for monitoring, the method comprising:
    detecting, by one or more sensors coupled to a monitoring device, a first set of contextual information associated with movement of the monitoring device, the monitoring device comprising a Complex Event Processing (CEP) engine; and
    selecting, by the monitoring device, a particular one compliance query from one or more compliance queries, wherein a clause of the particular one compliance query includes the detected first set of contextual information, the clause reflecting an event determined based on location.

2. The method of claim 1, the method further comprising:
    receiving a second set of contextual information; and
    selecting, by the monitoring device, the particular one compliance query from one or more compliance queries, wherein the particular one compliance query further includes the received second set of contextual information.

3. The method of claim 2, wherein retrieving the particular one compliance query from one or more compliance queries further comprising:
    identifying one or more compliance queries based on the detected first set of contextual information and the received second set of contextual information, wherein each of the identified one or more compliance queries has a set of parameters;
    determining a value of a first parameter of the set of parameters based on the detected first set of contextual information and the received second set of contextual information; and
    retrieving the particular one compliance query from the identified one or more compliance queries, wherein corresponding first parameter of the particular one compliance query equals to the determined value.

4. The method of claim 2, wherein the received second set of contextual information includes a floor plan.

5. The method of claim 2, wherein the received second set of contextual information includes a profile.

6. The method of claim 1, wherein the detected first set of contextual information includes location and time.

7. The method of claim 1, wherein the detected first set of contextual information includes movement status.

8. The method of claim 3, wherein determining a value of a first parameter of the set of parameters comprising determining a time window size.

9. The method of claim 7, wherein the movement status includes movement speed and movement orientation.

10. The method of claim 1, wherein the one or more sensors coupled to the monitoring device include accelerometer, Bluetooth, and Wi-Fi.

11. The method of claim 1, the method further comprising:
    determining, at the monitoring device, a compliance violation; and
    presenting a compliance violation notification, at the monitoring device, based on the detected first set of contextual information.

12. The method of claim 1, wherein the detected first set of contextual information includes proximity of people around the monitoring device.

13. The method of claim 1, wherein the detected first set of contextual information includes environment data.

14. The method of claim 11 further comprising receiving a second set of contextual information, wherein the received second set of contextual information includes a profile and wherein presenting a compliance violation notification is further based on the profile.

15. The method of claim 11, wherein presenting a compliance violation notification further comprising determining a compliance violation notification mode.

16. The method of claim 15, wherein the compliance violation notification mode includes audio, visual and motion.

17. The method of claim 11, the method further comprising sending an aggregated compliance report from the monitoring device.

18. A method for formulating a compliance query, the method comprising:
    identifying, using a processor, a compliance event sequence; and
    formulating, using the processor configured to execute a CEP query formulator, a compliance query comprising a set of parameters, wherein the compliance event sequence is translated to the set of parameters based on ontology and the compliance query being adaptively formulated in response to the translated set of parameters.

19. The method of claim 18, wherein the set of parameters of the compliance query is further updated based on a floor plan.

20. The method of claim 18, wherein the set of parameters of the compliance query is further updated based on a profile hierarchy.

21. The method of claim 20, further comprising:
    identifying a monitoring device;
    determining a profile based on relationship between a monitoring device identification and a profile hierarchy; and
    distributing a set of compliance queries to the monitoring device based on the determined profile.

22. A device for monitoring and notification, the device comprising:
    at least one processor configured to provide functions of a Complex Event Processing (CEP) engine;
    one or more sensors coupled to the at least one processor; and
    memory that stores computer readable instructions, which when executed by the processor cause the device to:
    detect, by the one or more sensors, a first set of contextual information associated with movement of the device;
    receive a second set of contextual information; and
    select a compliance query, the compliance query including a clause reflecting the detected first set of contextual information and the received second set of contextual information.

23. A monitoring device, comprising:
    at least one processor configured to provide functions of a Complex Event Processing (CEP) engine for compliance verification; and
    an interface coupled to the at least one processor;
    wherein the at least one processor is configured to, upon determination of a compliance violation:

provide a notification information at the interface in a mode, the mode determined based on the level of the compliance violation and context of the monitoring device; and
gradually change the mode based on actions taken in response to the provided notification information.

* * * * *